Feb. 20, 1940.   R. B. LEWIS   2,191,282
AUTOMATIC LOAD HOLDER FOR TESTING MACHINES
Filed March 26, 1937    3 Sheets-Sheet 1
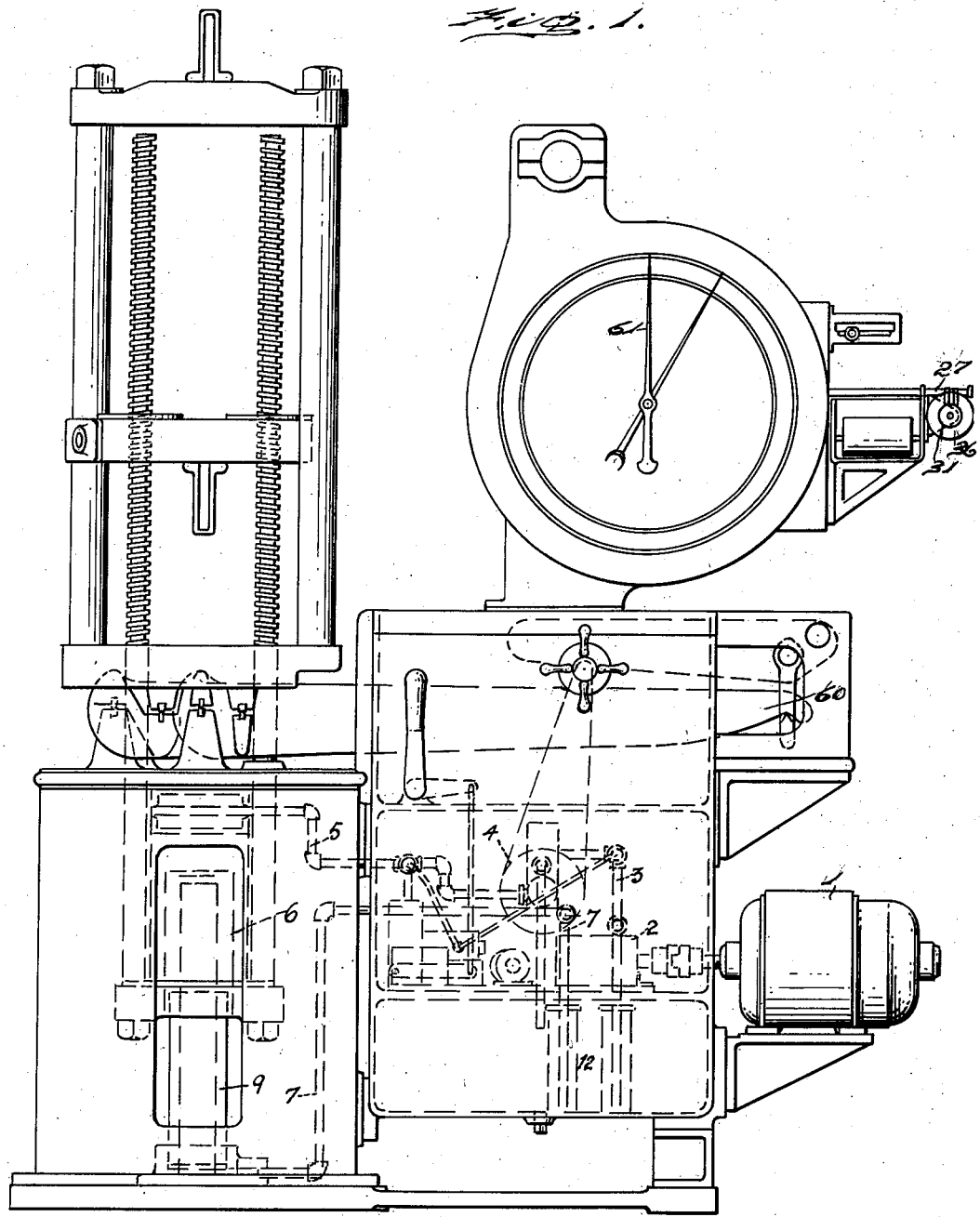
INVENTOR
Robert B. Lewis
BY
Herbert S. Fairbanks
ATTORNEY

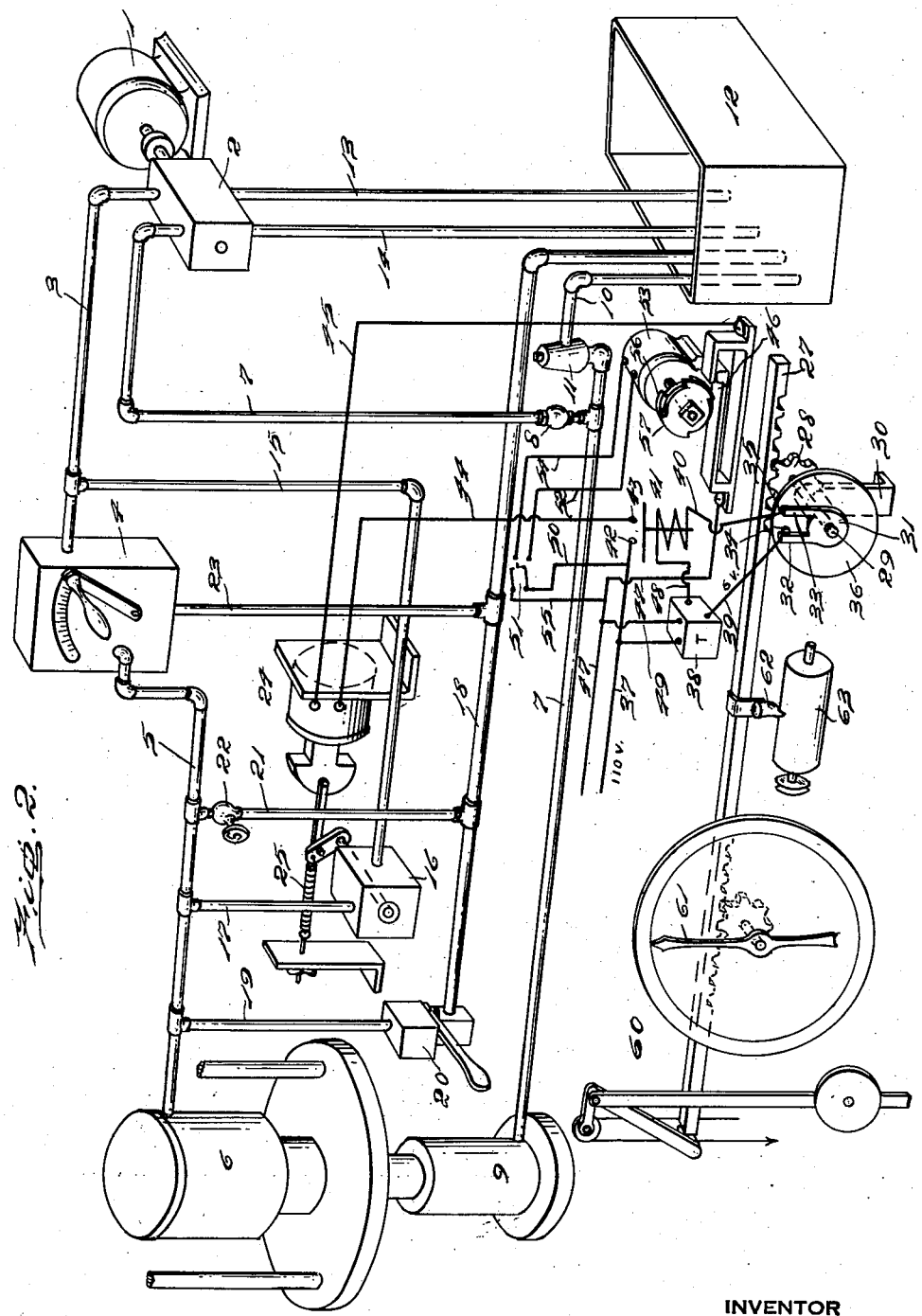

Feb. 20, 1940.　　　R. B. LEWIS　　　2,191,282
AUTOMATIC LOAD HOLDER FOR TESTING MACHINES
Filed March 26, 1937　　　3 Sheets-Sheet 3
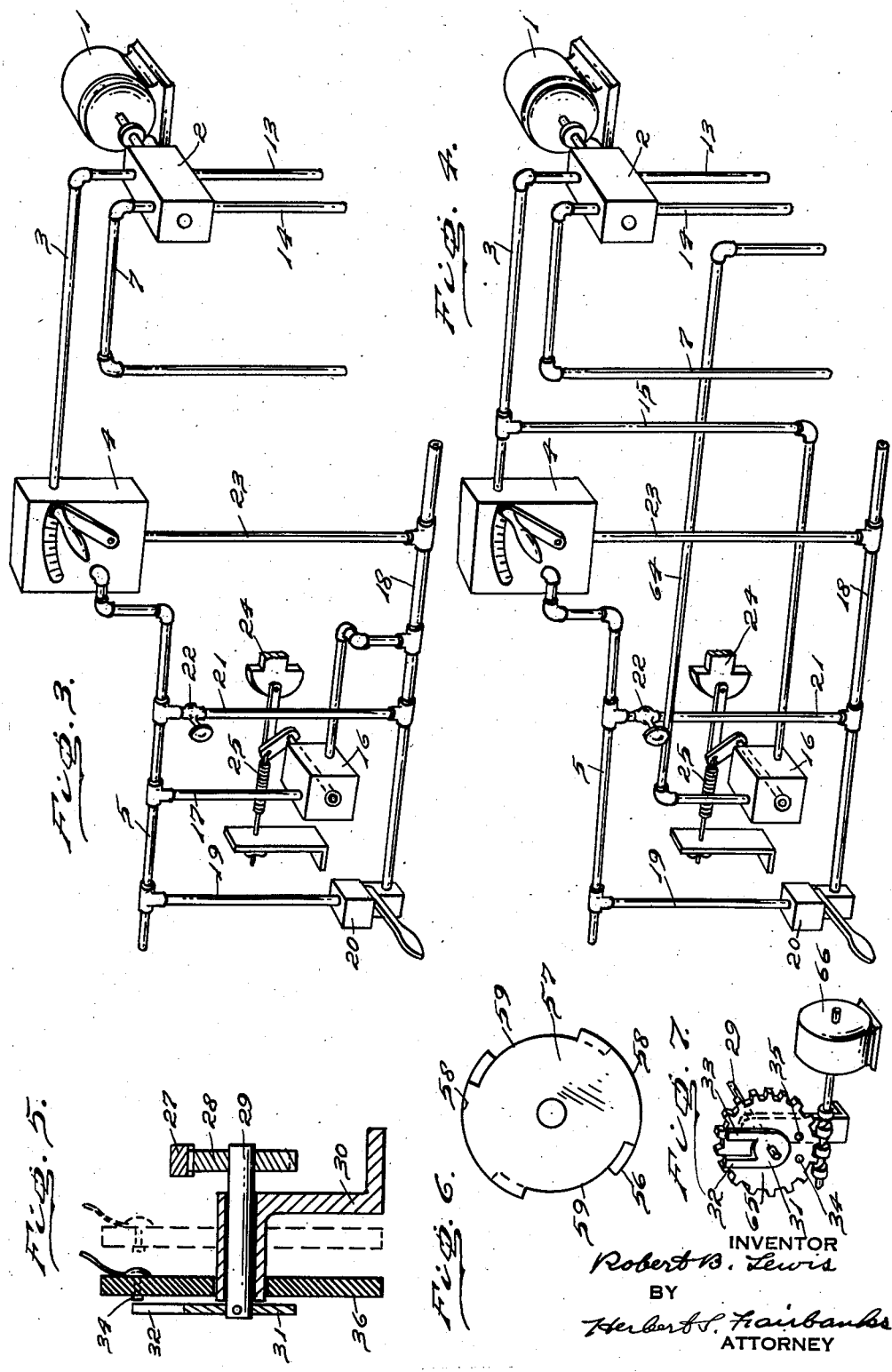

Patented Feb. 20, 1940

2,191,282

UNITED STATES PATENT OFFICE 2,191,282

AUTOMATIC LOAD HOLDER FOR TESTING MACHINES

Robert B. Lewis, Philadelphia, Pa., assignor to Tinius Olsen Testing Machine Company, Philadelphia, Pa., a corporation of Pennsylvania Application March 26, 1937, Serial No. 133,190

12 Claims. (Cl. 265—14)

The object of this invention is to devise a novel automatic load holder for hydraulic testing machines which will hold the load regardless of changes in viscosity of the hydraulic medium. This means that a predetermined pressure is kept on the specimen in the testing machine regardless of changes in viscosity of the oil or hydraulic fluid. A valve in the feed line from a pump to the pressure cylinder of the testing machine determines the speed of cross head action of the testing machine and is proportional to the valve opening. As the oil heats up due to the pressure created, the viscosity is affected, and leakage around the ram in the pressure cylinder increases to reduce the pressure in the pressure cylinder below the required predetermined pressure.

It will thus be clear that unless some means is provided to increase the pressure in the pressure cylinder, the predetermined pressure or load will not be maintained on the specimen under test.

Other novel features of construction and advantage will hereinafter more clearly appear in the detailed description and the appended claims.

For the purpose of illustrating the invention, I have shown in the accompanying drawings typical embodiments of it, which, in practice, will give reliable and satisfactory results. It is, however, to be understood that these embodiments are typical only and that the various instrumentalities of which my invention consists can be variously arranged and organized, and the invention is not limited to the precise arrangement and organization of these instrumentalities as herein set forth.

Figure 1 is a front elevation of a hydraulic type testing machine in conjunction with which the present invention may be employed.

Figure 2 is a diagrammatic view of operating parts.

Figure 3 is a diagrammatic view of a modification of the construction shown in Figure 2.

Figure 4 is a diagrammatic view of another modification of the construction shown in Figure 2.

Figure 5 is a longitudinal section of a timing switch.

Figure 6 is a side elevation, in detached position of cams employed.

Figure 7 is a perspective view of means for causing a contact carrying member to act as a pacer.

Similar numerals indicate corresponding parts.

Referring to the drawings—

A motor 1 drives a duplex pump 2 which has a discharge or feed line 3 to a control valve 4 having a dial to indicate the pressure. A line 5 leads from the control valve 4 to the pressure cylinder 6 of the testing machine. The lines 3 and 5 are thus pressure lines for the pressure cylinder 6. The pump 2 has a line 7 provided with a check valve 8 and leading to the return cylinder 9 of the testing machine. A line 10 having a safety valve 11 leads to a return reservoir 12. The safety valve 11 is set for a predetermined pressure so that a predetermined pressure will be maintained in the return cylinder 9 so that the piston of the pressure cylinder will be returned in the well known manner during the operation of the testing machine.

Excess fluid from the duplex pump 2 is returned to the return reservoir 12 by pipes 13 and 14. Fluid can be by-passed around the control valve 4 by a by-pass line 15 having a normally closed valve 16 connected by a line 17 with the feed line 5.

18 is a return line to the reservoir 12 and leads from a manually actuated quick unloading valve 20 which communicates by line 19 with the feed line 5. A line 21 leading from the feed line 5 has a manually actuated, slow unloading valve 22. The overflow from the control valve passes by line 23 to return line 18 and therefrom to the reservoir 12.

The valve 16 is controlled by an electromagnet 24 and its movable part is tensioned by a spring 25. The movable part of the electromagnet is operatively connected to the valve 16 to actuate it. A rack 27 actuated by the cross head motion, turns a dial hand of the dial indicator of the weighing system of the testing machine in the conventional manner and also drives a pinion 28 on a shaft 29 suitably journalled in a bearing bracket 30. The shaft 29 has a contact member 31 fixed to it so that it turns with the shaft. The contact member 31 has two arms 32 and 33 to close and open an electric circuit through contacts 34 and 35 on a contact member 36 which is stationary as in Figure 2 or rotatable as in Figure 7. The contact member 36 in Figures 2 and 5 is rotatably adjustable on the shaft and can be moved longitudinally inwardly, when automatic operation of the magnetically controlled switch 16 is not desired, to move its contacts 34 and 35 out of the path of the arms 32 and 33, as shown in dotted lines in Figure 5.

The current passes from a source of 110 volt supply by line 37 to a six volt transformer 38 and therefrom by line 39 to contact 34, contact member 31, contact 35 and line 40 to solenoid switch 41 to close the circuit through contacts 42 and 43 so that the current passes by line 44 to electromagnet 24 to energize it. The energization of the electromagnet 24 moves its movable part in a direction to open the valve so that the fluid from the pump can by-pass around the control valve 4 by line 15, valve 16 and line 17 to increase the pressure in feed line 5 and thereby in the pressure cylinder 6. The return from the electromagnet 24 is by line 45, circuit breaker 46 and line 47.

The solenoid switch 41 has a return line 48 to the transformer 38 and the transformer 38 has a return line 49 to return line 47.

In some tests it is desirable to have the valve 16 intermittently opened at predetermined intervals so that hydraulic fluid will be intermittently by-passed in small quantities from feed line 3 to feed line 5. For this purpose a line 50 leads from line 37 to a switch 51, the latter having a line 52 leading to a motor 53. The return from the motor 53 is by line 54, switch 51, line 55 and line 47.

The circuit breaker 46 serves only as a timer for the energization or de-energization of the electromagnet 24.

The shaft of the motor 53 has rotatably adjustable on it two cams 56 and 57, each of which has a cam face 58 and a dwell 59. By relative rotary adjustment of these two cams the times at which the circuit breaker is opened and closed may be varied.

60 designates the weighing system of the hydraulic testing machine which is controlled by the cross head motion of the testing machine to actuate the rack and thereby the dial hand 61 of the pressure indicator.

In Figure 7, I have shown a contact member 65 corresponding to the stationary contact member 36 in Figure 2 but in the form of a gear intergeared with the shaft of a driving motor 66. In this case the contact member 65 is rotated to provide an interval of time before the arms 32 and 33 can close and open the circuit of the electromagnet through contacts 34 and 35.

The use of the motor 53 and its cams is optional.

In the embodiment shown in Figure 2, I provide means to automatically increase the pressure in feed line 5.

In the embodiment seen in Figure 3 the control valve 4 is set for an overload and the pressure in feed line 5 is reduced to maintain a constant loading pressure in the pressure cylinder 6. In this case the construction is the same as that seen in Figure 2 except that the by-pass line 15 is omitted and the return line 18 is connected with the valve 16 so that when such valve 16 is open oil can pass from feed line 5, line 17, valve 16 and return line 18 to the reservoir 12.

In the embodiment seen in Figure 4, instead of increasing the pressure in feed line 5 as in Figure 2, or reducing the pressure in feed line 5 as in Figure 3, the pressure is reduced in feed line 3. In this case, the line 17 of Figure 2 is omitted and the discharge from valve 16 is by line 64 to the reservoir 12. This reduces the pressure passing to the control valve 4.

The operation will now be apparent to those skilled in this art and is as fallows:

When the pressure in feed line 5 is applied to the conventional ram or piston in the pressure cylinder 6, a loading pressure is created on the specimen under test which causes a variation in length of the test specimen. This actuates the weighing system and causes the rack 27 to move.

The return cylinder 9 maintains a substantially constant pressure beneath the piston of the pressure cylinder 6 and when the loading pressure is released effects the return of the piston of the pressure cylinder to its initial position for a new testing operation. The pressure in line 7 between return cylinder 9, check valve 8, and safety valve 11 and in the return cylinder is determined by the setting of the safety valve 11. The discharge from the safety valve is by line 10 to reservoir 12.

Assuming now that the specimen to be tested has been secured in place and referring to Figure 2, the control valve 4 is opened to a desired dial setting and the hydraulic fluid passes by feed line 3, control valve 4 and feed line 5 to the pressure cylinder 6. As the specimen changes in length due to the applied load, the rack 27 moves forwardly to turn the gear 28 and thereby the shaft 29 and contact member 31. When the arms 32 and 33 engage the contacts 34 and 35 on the stationary contact member 36, the circuit is closed by the solenoid switch 41 and current passes by line 37, transformer 38, line 39, contact 34, contact arms 32 and 33, line 40, solenoid switch 41, line 44 to electromagnet 24 to energize it and cause the valve 16 to open. Hydraulic fluid can now be by-passed around the control valve by line 15, valve 16 and line 17 to feed line 5 to increase the pressure in feed line 5 to compensate for leakage of fluid by the piston in pressure cylinder 6.

If the arms 32 and 33 are moved out of engagement with the contacts 34 and 35, the solenoid switch is de-energized thus opening the circuit, de-energizing the electromagnet 24 and the valve 16 closes so that the only hydraulic fluid passing to the pressure cylinder 6 is by feed line 3, control valve 4 and feed line 5. If the loading pressure in the pressure cylinder 6 decreases below the predetermined loading pressure, the above cycle of operation is repeated.

The use of the circuit breaker 46 is optional. The cams 56 and 57 driven by the motor 53 are relatively adjustable so that their outer peripheries may form a complete circle in which case the circuit breaker is not operated. These cams may be relatively adjusted to form cam faces spaced a desired number of degrees apart so that the circuit breaker 46 will automatically open and close the electric circuit for the electromagnet 24 of the valve 16 at selected time intervals.

The operation of the embodiments seen in Figures 3 and 4 have been set forth in the detailed description.

If the embodiment seen in Figure 7 is used, the time intervals for opening and closing the electric circuit can be varied since the gear 65 must rotate to bring the contacts 34 and 35 into the path of the arms 32 and 33 with which they cooperate.

If a quick unloading of the pressure in the high pressure cylinder is desired, the quick unloading valve 20 is opened and fluid can pass from feed line 5 to line 18 and reservoir 12.

If a slow unloading of the pressure in pressure cylinder 6 is desired, the slow unloading valve 22 is opened and fluid from feed line 5 can pass by lines 21 and 18 to the reservoir 12.

The pump 2 can be driven to provide an excess pressure in the line 3, or the required pressure for the pressure cylinder 6.

The return cylinder is shown to illustrate one manner of returning the piston in the high pressure cylinder, but it is to be understood that this is only for the purpose of illustration and any desired means may be employed for this purpose, such as for example, springs, fluid pressure or the high pressure cylinder may be arranged so that its piston will return by gravity.

Having thus described my invention, what I claim as new and desire to secure by Letters Patent is:

1. In an automatic load holder for hydraulic testing machines, having a high pressure cylinder, means to load the high pressure cylinder, an electromagnetic valve controlling the augmenting of pressure in the high pressure cylinder, and an electric circuit which includes the electromagnetic valve and has a circuit opening and closing device automatically controlled by the weighing system of the testing machine.

2. In an automatic load holder for hydraulic testing machines, having a high pressure cylinder, means to load the high pressure cylinder, an electromagnetic valve controlling the augmenting of pressure in the high pressure cylinder, an electric circuit which includes the electromagnetic valve and has a circuit opening and closing device automatically controlled by the weighing system of the testing machine and a motor driven circuit breaker for said circuit.

3. In an automatic load holder for hydraulic testing machines, having a high pressure cylinder, means to load the high pressure cylinder, an electromagnetic valve controlling the augmenting of pressure in the high pressure cylinder, an electric circuit which includes the electromagnetic valve and has a circuit opening and closing device automatically controlled by the weighing system of the testing machine and a motor driven circuit breaker for said circuit and having adjustable means to vary the time the circuit is opened and closed by said circuit breaker.

4. In an automatic load holder for hydraulic testing machines, having a high pressure cylinder, means to load the high pressure cylinder, an electromagnetic valve controlling the augmenting of pressure in the high pressure cylinder, and an electric circuit which includes the electromagnetic valve and has a circuit opening and closing device including a stationary contact member and a movable contact member which latter is driven and automatically controlled by the weighing system of the testing machine.

5. In an automatic load holder for hydraulic testing machines, having a high pressure cylinder, means to load the high pressure cylinder, an electromagnetic valve controlling the augmenting of pressure in the high pressure cylinder, and an electric circuit which includes the electromagnetic valve and has a circuit opening and closing device and comprising a motor driven contact member and a cooperating contact member driven and automatically controlled by the weighing system of the testing machine.

6. In an automatic load holder for hydraulic testing machines, having a high pressure cylinder, means to load the high pressure cylinder, an electromagnetic valve controlling the reducing of pressure in the high pressure cylinder, and an electric circuit which includes the electromagnetic valve and has a circuit opening and closing device automatically controlled by the weighing system of the testing machine.

7. In an automatic load holder for hydraulic testing machines, having a high pressure cylinder, a motor driven pump supplying pressure to said cylinder, a valve controlling the flow from said pump to the high pressure cylinders, a by-pass from the pump around the control valve and leading to the high pressure cylinder, a valve for said by-pass, an electromagnet controlling the by-pass valve, and means automatically controlled by the weighing system to control said electromagnet and thereby maintain a uniform rate of loading for the high pressure cylinder.

8. In an automatic load holder for hydraulic testing machines, having a high pressure cylinder, a motor driven pump supplying pressure to said return cylinder, a valve controlling the flow from said pump to the high pressure cylinders, a by-pass from the pump around the control valve and leading to the high pressure cylinder, a valve for said by-pass, an electromagnet controlling the by-pass valve, and means automatically controlled by the weighing system to control said electromagnet and thereby maintain a uniform rate of loading for the high pressure cylinder, said automatic means including a motor driven circuit breaker.

9. In an automatic load holder for hydraulic testing machines, having a high pressure cylinder, a motor driven pump supplying pressure to said cylinder, a valve controlling the flow from said pump to the high pressure cylinders, a by-pass from the pump around the control valve and leading to the high pressure cylinder, a valve for said by-pass, an electromagnet controlling the by-pass valve, and means automatically controlled by the weighing system to control said electromagnet and thereby maintain a uniform rate of loading for the high pressure cylinder, said automatic means including a motor driven circuit breaker having adjustable means to time the opening and closing of the circuit of the electromagnet.

10. In an automatic load holder for hydraulic testing machines, having a high pressure cylinder, a motor driven pump, a supply line from the pump to the cylinder, a control valve for the supply line, a reservoir, a return line from the outlet side of the control valve to the reservoir, an electromagnetic valve controlling said return line, and an electric circuit which includes the electromagnetic valve and has a circuit opening and closing device forming a part of the electric circuit and controlled by the weighing system of the testing machine.

11. An automatic load holder for hydraulic testing machines, having a high pressure cylinder, comprising means to load the high pressure cylinder to maintain a substantially constant load indication, and means independent of the loading means and controlled by the weighing system to augment the pressure in the high pressure cylinder to automatically maintain a substantially uniform rate of loading.

12. An automatic load holder for hydraulic testing machines, having a high pressure cylinder, comprising means to load the high pressure cylinder to maintain a substantially constant load indication, and means independent of the loading means and controlled by the weighing system to vary the pressure in the high pressure cylinder to automatically maintain a substantially uniform rate of loading.

ROBERT B. LEWIS.